United States Patent [19]

Tsai

[11] Patent Number: 5,739,879
[45] Date of Patent: Apr. 14, 1998

[54] BACKLIGHTING DEVICE FOR LIQUID CRYSTAL DISPLAYS

[75] Inventor: Tzeng-Shii Tsai, Hsinchu Hsien, Taiwan

[73] Assignee: Industrial Technology Research Institute, Hsinchu, Taiwan; .

[21] Appl. No.: 555,942

[22] Filed: Nov. 13, 1995

[51] Int. Cl.$^6$ .................. G02F 1/1335; G01D 11/28
[52] U.S. Cl. .................. 349/62; 349/64; 349/71; 362/26
[58] Field of Search .................. 359/49, 50; 362/26, 362/31; 349/62, 64, 71, 70; 372/80

[56] References Cited

U.S. PATENT DOCUMENTS

| | | | |
|---|---|---|---|
| 3,995,191 | 11/1976 | Kaduk et al. | 313/485 |
| 4,088,802 | 5/1978 | Shriver | 427/67 |
| 4,803,399 | 2/1989 | Ogawa et al. | 359/49 |
| 4,974,122 | 11/1990 | Shaw | 362/31 |
| 5,039,207 | 8/1991 | Green | 359/49 |
| 5,055,978 | 10/1991 | Rogoff | 362/31 |
| 5,190,365 | 3/1993 | Cordy, Jr. | 362/26 |
| 5,193,024 | 3/1993 | Lawton et al. | 359/253 |
| 5,248,917 | 9/1993 | Hamagishi et al. | 315/169.1 |
| 5,260,625 | 11/1993 | Holden et al. | 313/486 |

FOREIGN PATENT DOCUMENTS 5-53111  3/1993  Japan .

Primary Examiner—William L. Sikes
Assistant Examiner—Toan Ton
Attorney, Agent, or Firm—W. Wayne Liauh

[57] ABSTRACT

An improved high energy utilization efficiency backlighting device for liquid crystal displays is disclosed. It comprises: (a) a UV lamp with a UV transmitting quartz envelop for emitting and transmitting UV light; (b) a light guide disposed in front of the UV lamp which allows visible light to travel therethrough, the light guide having a front surface, a rear surface, and a proximal edge surface; (c) a lamp holder with a UV-reflecting interior surface, which, in cooperation with the proximal edge surface of the light guide, encloses the UV lamp; and (d) a fluorescent layer placed between the quartz envelop of the UV lamp and the proximal edge surface of the light guide capable of converting UV light into visible light. In a preferred embodiment, the UV-reflecting interior surface of the lamp holder is formed by coating with a layer of high-purity aluminum. The fluorescent layer is structured such that essentially none of the visible light converted from the UV light will travel therethrough. The fluorescent layer can be disposed on a portion of the exterior surface of the UV transmitting envelop facing the proximal edge surface of the light guide. Or the fluorescent layer can be formed on the proximal edge surface of the light guide. Furthermore, the proximal edge surface can be curved matching the curvature of the quartz envelope to further improve the energy utilization efficiency.

20 Claims, 6 Drawing Sheets

BACKLIGHTING DEVICE FOR LIQUID CRYSTAL DISPLAYS

FIELD OF THE INVENTION

The present invention relates to improved backlighting devices for liquid crystal displays. More specifically, the present invention relates to a high performance, thin-thickness backlighting device for liquid crystal displays which provides improved performance, reduces energy consumption, and allows the overall thickness of the liquid crystal display to be reduced. The improved backlighting device disclosed in the present invention also prolongs the battery life before recharging of a portable electronic device, such as portable or notebook personal computers and personal digital assistants, etc., which utilize a liquid crystal display.

BACKGROUND OF THE INVENTION

Liquid crystal displays (LCDs) have been widely used in portable electronic device, such as portable or notebook personal computers and personal digital assistants, etc., as a display screen. A liquid crystal display does not emit light itself. In order to show images (including characters), a high quality backlight device is required to show the screens. For a notebook PC, the energy consumed by the backlighting device typically accounts for 70% or more of the battery life before recharging. Therefore, it is an important task facing the electronic industry today to develop improved backlighting devices that will provide increased backlighting efficiency so as to extend the service life of a battery before recharging.

A typical backlighting device for use in liquid crystal displays is shown in FIG. 1. The typical backlighting device 1 comprises mainly one (or more) fluorescent lamp 11, a light guide 12, which is placed behind a liquid crystal display 13, with a diffuser 14 sandwiched therebetween. A lamp holder 15 is placed around the fluorescent lamp 11 to provide support therefor and reflect the light emitted therefrom. The light guide 12 is provided, via a printing process and at the bottom face thereof, with a plurality of specially designed sparsely and densely distributed reflecting points 16. A reflector surface 17 is place below the reflecting points 16. The light emitted from the fluorescent lamp 11 and travels through the light guide 12 will change its direction with the aid of the reflecting points 16 and the reflector surface 17. The design of the reflecting points 16, the reflector surface 17, and the diffuser 14 should ensure a uniform distribution of the light intensity onto the entire surface of the liquid crystal display.

A number of methods have been utilized or proposed in the art to improve the backlighting efficiency. These mainly involve improvements in the design of the lamp holders or the light guides, as well as improvements in the light emitting efficiency of the fluorescent lamp. It has also been proposed to add a prism sheet on the top of the diffuser so as to increase the brightness within a narrow viewing angle. However, this design sacrifices the brightness when viewed at wider viewing angles.

It has been well recognized that the shape and construction of the lamp holder can affect the backlighting efficiency. A number of design variations have been considered by liquid crystal display manufacturers. For example, the interior wall of the lamp holder can be designed to be close to the fluorescent lamp, or it can be designed to be at some distance away from the fluorescent lamp. The shape of the lamp holder can be hemispherical, elliptical, or polygonal, as shown in FIGS. 2a through 2c, which provide detailed views of the various constructions of the lamp holder design, which comprises a fluorescent lamp 11, a fluorescent layer 22 (on the interior surface of the lamp) and a lamp holder reflector surface 23 (on the outer surface of the lamp). The light guide 12 is attached to the lamp holder to enclose the fluorescent lamp 11.

The thickness of the light guide, especially the portion near the fluorescent lamp, can also affect the utilization efficiency of the emitted light. A light guide with a greater thickness will benefit the light utilization efficiency, at the expense of increased bulkiness. Light guides with smaller thickness, as shown in FIG. 2a, will benefit the space requirement; however, it also results in a relatively poorer light utilization efficiency, because they provide a narrower entrance for the emitted light to come into the light guide, and a large portion of the reflected emitted light will be subject to multiple reflections between the fluorescent layer 22 and the lamp holder reflector surface 23 (both are provided in the lamp holder) before it enters the light guide. Only a small portion of the reflected emitted light will be allowed to travel through the fluorescent layer 22 (and must travel through the fluorescent layer twice) before it enters the light guide. This further causes the light energy to be wasted. FIG. 2b shows that a thick light guide allows a wider entrance for the emitted light to enter. This reduces the number of times the emitted must be reflected and reduces the light energy loss.

The utilization efficiency of emitted light energy can also be improved by using a polygonally-shaped lamp holder, as shown in FIG. 2c. As shown in FIG. 2c, the, polygonally-shaped lamp holder allows a portion of the emitted light to enter the light guide without having to travel, in multiple passes, through the lamp tube, to thereby minimize the loss in the emitted light energy. The transmittance to visible light in the lamp tube (lead glass) is lower (about 95%) than that in air.

U.S. Pat. No. 5,260,625 (also Japan Laid-Open Patent Publication JP-4370650) discloses a sequential backlighting system for liquid crystal displays. It comprises a plurality of lamps for emitting blue, red and green light. The red and green light is provided by lamps including fluorescent dyes having optical decay times similar to a phosphor material used to provide the blue light. This allows the light emitted to be fully synchronized with the electrical signals applied to the lamps in order to generate this light. In the '625 invention, a plurality of illuminating means are provided to introduce light from both edges of the backlight display system, whose rear surface is coated with a reflective layer so that the light introduced thereto is emitted via a front face. The illuminating means comprises a glass envelop, whose inside surface is coated with a blue phosphor material in the form of a powder. The ends of the envelop are sealed and contain electrodes for exciting a discharge within a gas contained inside the glass envelop. A dye-doped organic fluorescent material (in the form of a plastic material) is provided around the outside of the glass envelop. During the operation of the illumination means, the discharge in the gas causes generation of light (which can be visible and/or ultra-violet light) within the glass envelop. This causes the blue phosphor powder to emit blue light, which, in turn, stimulates fluorescence within the fluorescent plastic material to emit green and red light. The '625 device differs from most other backlighting devices in that, instead of emitting visible light, it emits red, blue and green light.

U.S. Pat. No. 5,190,365 discloses a backlighting system comprising a lamp which comprises an inner plasma region confined within a glass envelop for generating short wavelengths of light, and a phosphorescent strip deposited on a portion of the inner surface of the glass envelop. The phosphorescent strip is provided to convert the short wavelengths of light to visible light. One of the main drawbacks of the backlighting device disclosed in the '365 patent is the escape of the short wavelengths of light, thus resulting in inefficient utilization of the emitted light energy.

U.S. Pat. No. 4,974,122 discloses a compact backlighting laminar for liquid crystal displays. The laminar incorporates a fluorescent lamp and an optical body having a plurality of sloped, wedge-shaped surfaces to provide effective and uniform backlighting for flat panel LCD displays. Because of these changes, the '122 device suffers the problems of increased thickness and weight of the final device.

Japan Laid-Open Patent Publication JP 62-4974122 discloses backlighting device, as shown in FIG. 3, in which a fluorescent layer 31 is coated on the inside surface of cylindrical glass envelop 32 of the lamp with a small portion of the fluorescent layer being scratched off to provide an opening which allows the emitted light to be concentrated and exit therethrough. This improves the utilization efficiency of the emitted light.

U.S. Pat. Nos. 3,995,191 and 4,088,802, and Japan Laid-Open Patent Publication JP 01-143,130 disclose backlighting devices which incorporate a reflective magnesium oxide or titanium oxide layer below the phosphor layer to increase the reflection efficiency of the emitted light. U.S. Pat. No. 3,995,191 discloses an aperture-type fluorescent repographic lamps containing a reflector layer, which utilizes a titanium dioxide admixture containing up to 15 wt % magnesia. The reflector layer underlies a phosphor layer, and an aluminum oxide layer is deposited on the phosphor layer. U.S. Pat. No. 4,088,802 discloses a process for coating elongated lamp envelops for reflector-type fluorescent lamp. The reflector portion of the coating is formed of mixed titana and phosphor, which permits the reflective material to be removed from the end portion of the coated envelop after the applied reflective material coating and the overlying phosphor have been lehred. FIG. 4 is an illustrative schematic diagram of these techniques. In FIG. 4, the reflective material is shown as 41, the fluorescent layer is shown as 42, and the glass tube is shown as 43. For small fluorescent lamps used for liquid crystal displays, it is quite difficult to implement these methods inside the lamp tube.

Fujitsi Kasei in Nikkei Electronics Asia published in April, 1993 claimed that by using a V-shaped guide as shown in FIG. 5, instead of the traditional rectangular cross-section shape, the utilization efficiency of the emitted light can be improved. However, similar to the device disclosed in the device disclosed in the '122 patent, this modification would result in increased thickness of the light guide and the overall volume of the liquid crystal display. FIG. 5 shows the components of lamp 51, V-shaped light guide 52, diffuser 53, reflector 54, and an empty space 55 formed between the V-shaped light guide 52 and the diffuser 53.

U.S. Pat. No. 5,039,207 discloses a liquid crystal device containing a backlighting means having a layer of light-transmitting material formed with a prismatic region at one edge and a plurality of light sources of differing chromatic output, located adjacent the prismatic region. The device disclosed in the '207 patent is technically difficult to implement, and its benefits are not readily warranted.

SUMMARY OF THE INVENTION

The primary object of the present invention is to develop an improved backlighting device for liquid crystal displays. More specifically, the primary object of the present invention is to develop a high performance, thin-thickness backlighting device for liquid crystal displays which provides improved performance, reduces energy consumption by improving the utilization efficiency of the emitted light energy, and allows the overall thickness of the liquid crystal display to be reduced. However, the backlight disclosed in the present invention can also be advantageously used in thick liquid crystal displays.

One of the key elements of the backlighting device disclosed in the present invention involves an improved lamp design, which results in greatly reduced energy waste and thus greatly increases the energy utilization efficiency. With the backlighting device disclosed in the present invention, the thickness of the light guide can be substantially reduced to provide a compact liquid crystal display, while still achieving the same extent of high light energy utilization.

The backlighting device disclosed in the present invention mainly comprises the following components:

(a) an ultra-violet lamp;
(b) a light guide which allows visible light to effectively travel therethrough;
(c) a amp holder with a UV-reflecting inner surface; and
(d) a fluorescence layer placed between the ultra-violet lamp and the light guide capable of converting ultra-violet light into visible light.

During the operation of the backlighting device disclosed in the present invention, the ultra-violet lamp emits only the UV light, which will travel through the glass envelop defining the lamp and be reflected by the UV-reflecting surface provided on the inner surface of the amp holder until it travels through the fluorescence layer and into the light conducting light guide. One of the key differences between the backlighting devices of the present invention and those in the prior art is that, in the present invention, the visible light does not have to travel through any fluorescence layer, thus a superior energy utilization efficiency can be achieved. This high energy utilization efficiency is achieved by the fact that little or no visible light is absorbed by the fluorescent layer. Furthermore, because the ultra-violet light travels through the fluorescence layer only when it enters the light guide, the efficiency of energy utilization is relatively independent of the thickness of the guide layer. This is another distinctive advantage of the present invention over the prior art backlight devices in that a compact liquid crystal display can be provided without compromising on the energy efficiency.

In the backlighting device disclosed in the present invention, the ultra-violet lamp can be a low pressure mercury lamp (either of the hot-cathode type or the cold-cathode type), the glass envelop defining the lamp can be quartz or other appropriate glass that is competent to allow effective transmittance of ultra-violet light at 253.7 nm (i.e., nominally 254 nm). In a preferred embodiment of the present invention the lamp holder is provided with a UV-reflecting inner surface, which is coated with a layer of high-purity aluminum film. The aluminum film has excellent reflectivity with respect to both ultra-violet light and visible light. The reflectivity of aluminum film with respect to visible light is only next to silver. However, silver does not provide a high reflectivity with respect to ultra-violet light. The fluorescent layer can be provided on a portion of the lamp surface, or on the edge of the light guide. It is preferred that the fluorescence layer contain fluorescent powders (i.e., fluorescent pigments), which either individually or collectively provide a fluorescence spectrum capable of emitting red, green and blue light, so as to provide the required light source for a color displays. Laboratory data show that the optimum thickness of the fluorescent layer should preferably be in the range between about 7 and 10 mg/cm², so as to obtain the maximum light emitting efficiency. However, other thickness of the fluorescent layer may be desired if a different fluorescent powder is used. A wide variety of combinations among the lamp, the lamp holder, and the light guide can also be utilized in the present invention to tailor for different applications.

BRIEF DESCRIPTION OF THE DRAWING

The present invention will be described in detail with reference to the drawing showing the preferred embodiment of the present invention, wherein.

DETAILED DESCRIPTION OF THE PREFERRED EMBODIMENT

Figure 1:
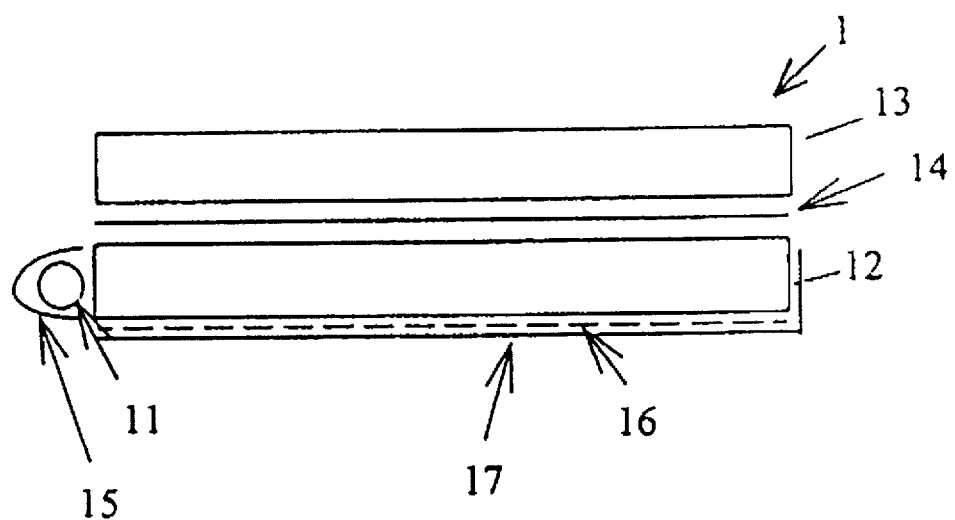
FIG. 1 is typical backlighting device for use in liquid crystal displays.

The present invention discloses an improved backlighting device for liquid crystal displays which provides improved performance, improves the utilization efficiency of the emitted light energy, reduces energy consumption, and allows the overall thickness of the liquid crystal display to be reduced without compromising the performance thereof.

The backlighting device disclosed in the present invention mainly comprises the following components: (a) a lamp for emitting ultra-violet light; (b) a light guide which allows visible light to travel therethrough; (c) a lamp holder with a UV-reflecting inner surface; and (d) a fluorescent layer placed between the ultra-violet lamp and the light guide capable of converting ultra-violet light into visible fight. In the present invention, the fluorescence layer can be placed on the portion of the outer surface of the ultra-violet lamp close to the light guide, or the fluorescence layer can be placed on the edge surface of the light guide closest to the lamp.

One of the key elements of the backlighting device disclosed in the present invention is the improved lamp design, which results in greatly reduced energy consumption and thus greatly increase the light (or energy) utilization efficiency. With the backlighting device disclosed in the present invention, the thickness of the light guide can be substantially reduced so as to provide a compact liquid crystal display, while still achieving the same extent of high light energy utilization. During the operation of the backlighting device disclosed in the present invention, the ultra-violet lamp emits only the UV light so as to maximize energy utilization. The IV light travels through the glass envelop, which defines the UV lamp, and is reflected by the UV-reflecting surface provided on the inner surface of the lamp holder until it hits the fluorescence layer. When this occurs, the ultra-violet light will be converted into visible light by the fluorescent layer and the resultant visible light will travel into the light conducting light guide without being subject to any energy loss. One of the key differences between the backlighting devices of the present invention and those in the prior art is that, in the present invention, the visible light does not travel through any fluorescence layer which could cause a portion of the visible light to be absorbed. Thus a superior energy utilization efficiency can be achieved. On comparison, in all of the prior art devices, the visible light will pass through the fluorescent layer at least one, thus incurring some energy loss and a low energy utilization efficiency. Furthermore, because the ultra-violet light travels through the fluorescence layer only when it enters the light guide, the efficiency of energy utilization is relatively independent of the thickness of the guide layer. This is another distinctive advantage of the present invention over the prior art backlight devices in that a compact liquid crystal display can be provided without compromising on the energy efficiency.

In a preferred embodiment of the backlighting device disclosed in the present invention, the ultra-violet lamp was a low pressure mercury lamp. The glass envelop which defined the lamp was made from quartz glass. However, other appropriate glasses competent to allow effective transmittance of ultra-violet light at 253.7 nm can also be used. The inner surface of the lamp holder was provided with a UV-reflecting layer, which was formed by coating with a layer of high-purity aluminum film. As discussed above, the aluminum film has excellent reflectivity with respect to both ultra-violet light and visible light. While silver film has a slightly better reflectivity with respect to visible light than an aluminum film, the reflectivity with respect to ultra-violet light is inferior for silver. The fluorescent layer can be provided on a portion of the lamp surface, or on the edge of the light guide. It is preferred that the fluorescent layer contains fluorescent powders (i.e., fluorescent pigments) which, either individually or collectively, provide a fluorescence spectrum capable of emitting red, green and blue light, so as to provide the required light source for a color displays. Laboratory data showed that the optimum thickness of the fluorescent layer should preferably be in the range between about 7 and 10 mg/cm², so as to obtain the maximum amount of light emitting efficiency. However, other thickness of the fluorescent layer may be desired if a different fluorescent powder is used. A wide variety of combinations among the lamp, the lamp holder, and the light guide can also be utilized in the present invention to tailor for different applications.

Now refer to the drawings. FIG. 1 shows typical backlighting device for use in liquid crystal displays. In FIG. 1, it is shown a typical backlighting device 1, which comprises one or more fluorescent lamps 11, a light guide 12, which is placed behind a liquid crystal display panel 13, with a diffuser sandwiched therebetween. A lamp holder 15 is placed around the fluorescent lamp 11 to provide support therefor and reflect the light emitted therefrom. The light guide 12 is provided, via a printing process and at the bottom face thereof, with a plurality of specially designed sparsely and densely populated reflecting points 16. A reflector surface 17 is place below the reflecting points 16 The light emitted from the fluorescent lamp 11 and travels through the light guide 12 will change its direction with the aid of the reflecting points 16 and the reflector surface 17 toward the liquid display panel.

Figure 2A:
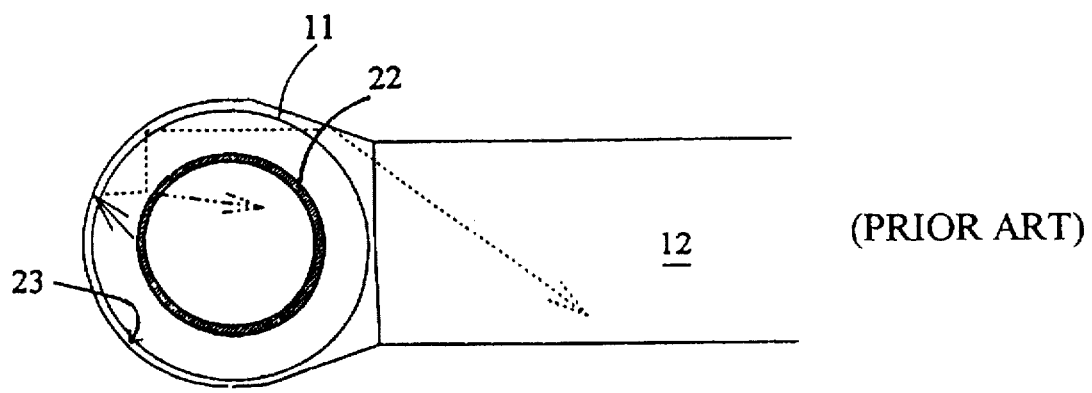
FIG. 2a is a schematic drawing showing a portion of a prior art backlighting device with a thin light guide.
Figure 2B:
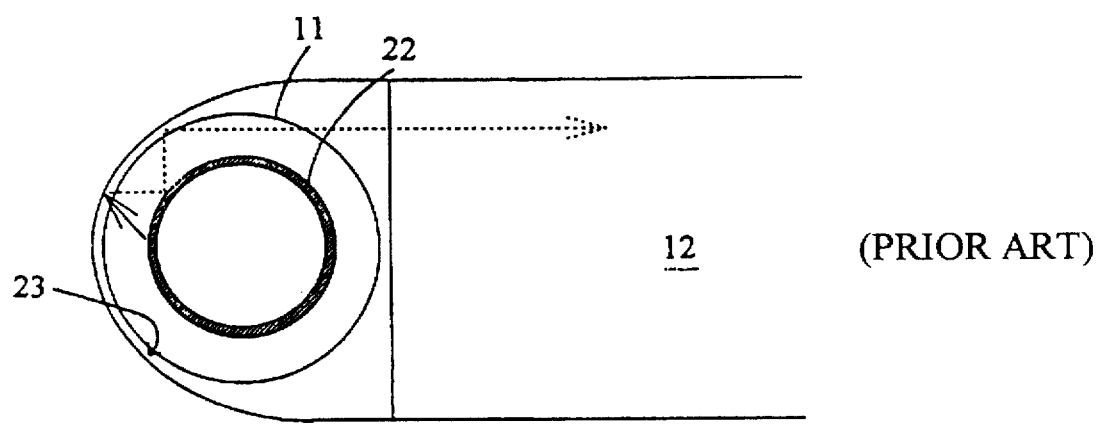
FIG. 2b is a schematic drawing showing a portion of another prior art backlighting device with a thick light guide.

FIG. 2a is a schematic drawing showing a portion of a prior art backlighting device with a thin light guide. In FIG. 2b, a thin light guide provides a narrower entrance for the emitted light to come into the light guide, thus a large portion of the reflected emitted light will be subject to multiple reflections between the fluorescent layer 22 and the lamp holder reflector surface 23 (the fluorescent layer 22 is provided on the inner surface of the lamp tube and the lamp holder reflector surface 23 is provided on the inner surface of the lamp holder) before it enters the, light guide. Only a small portion of the reflected emitted light will be allowed to travel through the fluorescent layer 22 (and must travel through the fluorescent layer twice) before it enters the light guide. This further causes the light energy to be wasted.

Figure 2C:
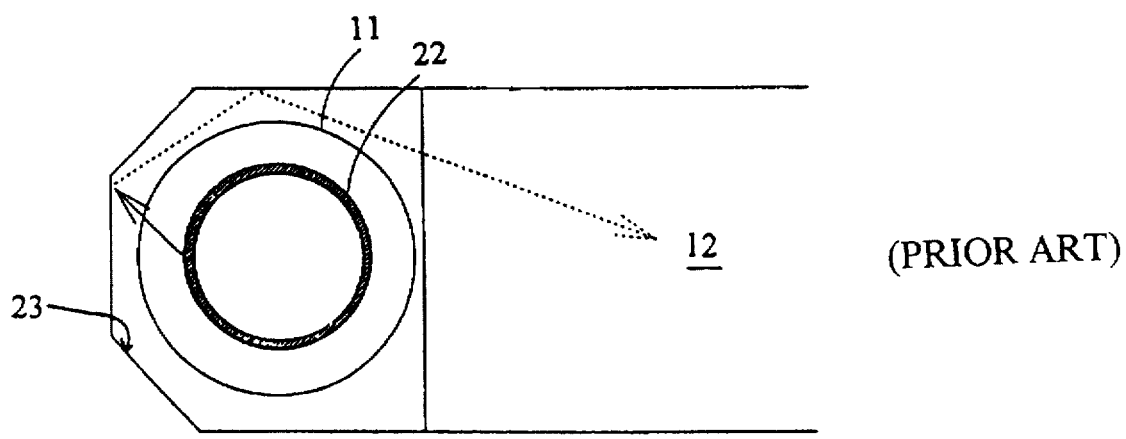
FIG. 2c is a schematic drawing showing a portion of yet another prior art backlighting device with a polygonally-shaped lamp holder and a thick light guide.

FIG. 2b is a schematic drawing showing a portion of another prior art backlighting device with a thick light guide. FIG. 2b shows that a thick light guide allows a wider entrance for the emitted light to enter. This reduces the number of times the emitted light must be reflected and reduces the light energy loss. However, this is done at the expense of increased thickness and the overall dimension. FIG. 2c is a schematic drawing showing a portion of yet another prior art backlighting device with a polygonally-shaped lamp holder and a thick light guide.

Figure 3:
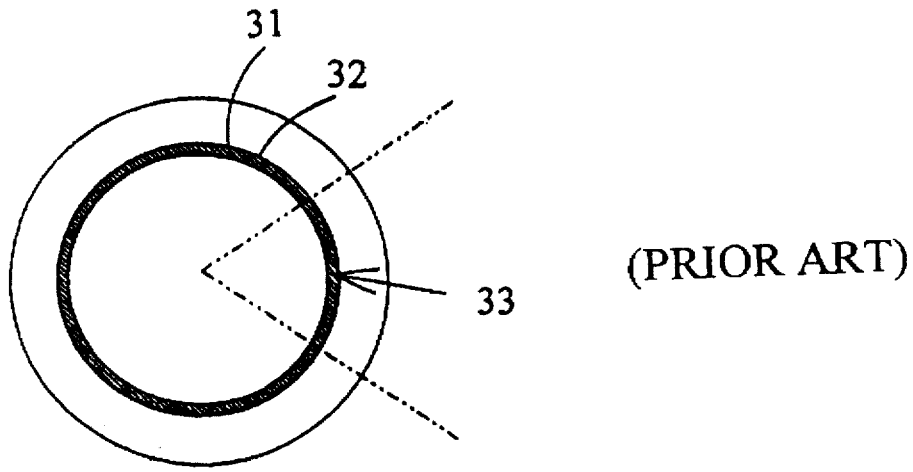
FIG. 3 is a schematic drawing of a prior art lamp design showing a fluorescent layer coated on the inner surface of the lamp tube, with a portion of the fluorescent layer being removed to allow the visible light to travel therethrough.
Figure 4:
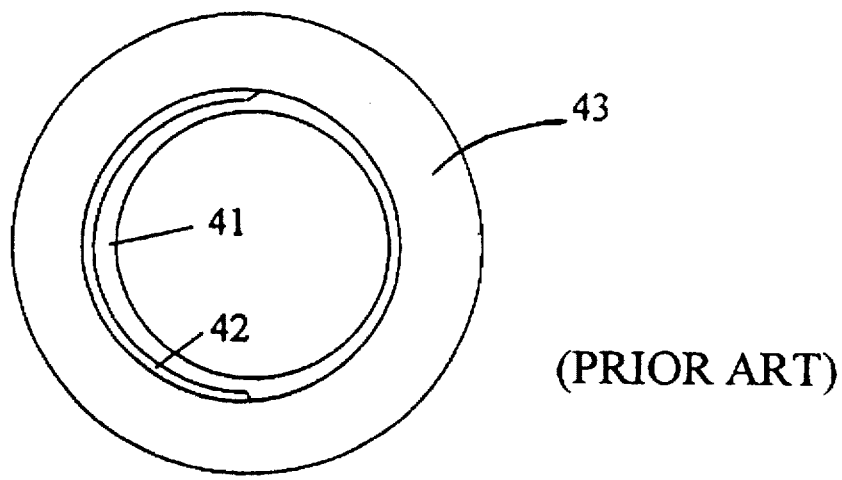
FIG. 4 is a schematic drawing of a prior art lamp design showing a reflector layer placed behind a fluorescent layer; both layers are provided on the inner surface of the lamp tube.

FIG. 3 is a schematic drawing of a prior art lamp design showing a fluorescent layer coated on the inner surface of the lamp tube, with a portion of the fluorescent layer being removed to allow the visible light to travel therethrough. In FIG. 3, a fluorescent layer 31 is shown to be coated on the inside surface of cylindrical glass envelop 32 of the lamp with a small portion of the fluorescent layer 33 being scratched off to provide an opening which allows the emitted light to be concentrated and exit therethrough. FIG. 4 is a schematic drawing of a prior art lamp design showing a reflector layer placed behind a fluorescent layer; both layers are provided on the inner surface of the lamp tube. In FIG. 4, the reflective material is shown as 41, the fluorescent layer is shown as 42, and the glass tube is shown as 43. For small fluorescent lamps used for liquid crystal displays, it is quite difficult to implement these methods inside the lamp tube.

Figure 5:
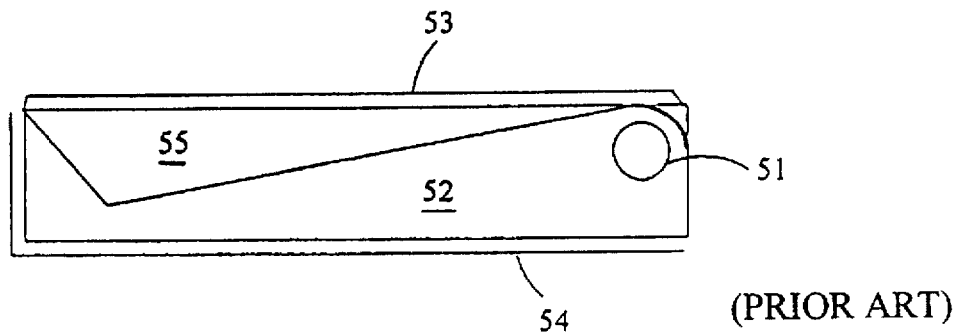
FIG. 5 is a schematic drawing of a V-shaped guide provided in the prior art.

FIG. 5 is a schematic drawing of a V-shaped guide provided in the prior art. FIG. 5 shows the components of lamp 51, a V-shaped light guide 52, a diffuser 53, a reflector 54, and an empty space 55 formed between the V-shaped light guide 52 and the diffuser 53. This modification would result in increased thickness of the light guide as well as the overall volume of the liquid crystal display.

FIGS. 6 through 10 will be discussed along with the discussion of the following examples.

The present invention will now be described more specifically with reference to the following examples. It is to be noted that the following descriptions of examples, including the preferred embodiment of this invention, are presented herein for purposes of illustration and description, and are not intended to be exhaustive or to limit the invention to the precise form disclosed.

EXAMPLE 1

Figure 7:
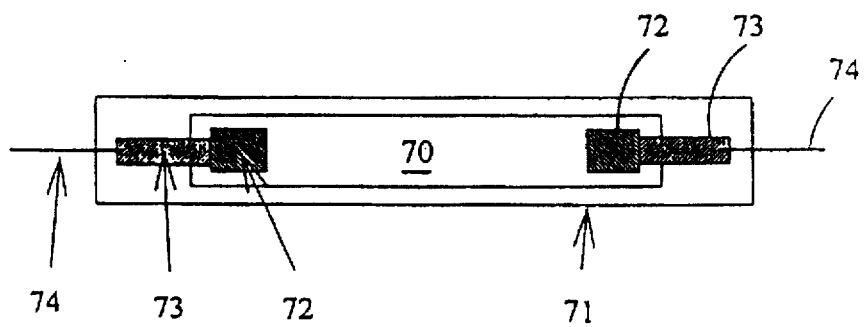
FIG. 7 is a schematic diagram of a preferred embodiment of the ultra-violet lamp for use in the backlighting device of the present invention.

A: Preparation of an ultra-violet lamp:

A 2 mm (inner diameter)×3 mm (outer diameter) GE#214 quartz tube, which is a high transmittance quartz tube having a transmittance with respect to ultra-violet light at 254 nm of at least 90%, or preferably at least 95%, was provided as the lamp envelop. An SAES (Italy) ST101/506 alloy, which is a titanium-mercury alloy, was used as the mercury-releasing electrodes. The electrodes were soldered with tin foil and tungsten wire as conductors. The construction of the ultra-violet lamp is illustrated in FIG. 7, which shows the glass envelop which is a quartz tube 71, mercury-releasing electrodes 72, each of which was soldered in sequence to tin foil 73 and tungsten wire 74. The glass envelop 71 contains argon and mercury vapors 70 in its internal space.

Figure 6:
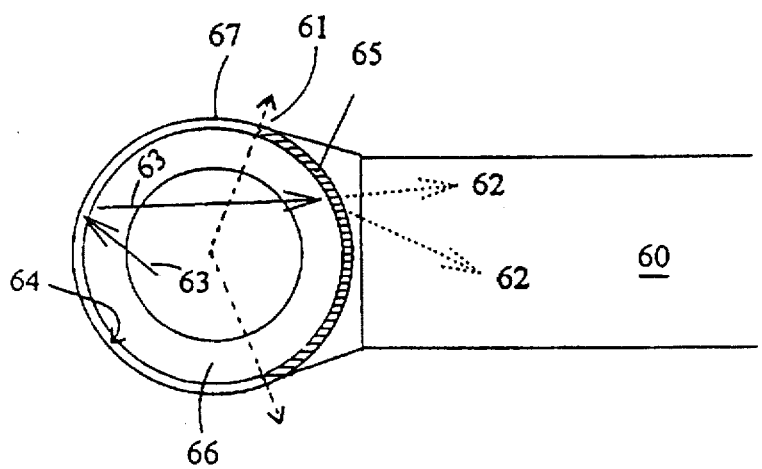
FIG. 6 is a schematic diagram of a preferred embodiment of the backlighting device of the present invention.

B: Coating of A Fluorescent Layer:

An RGB fluorescent powder was mixed with nitrocellulose and butyl acetate to prepare a fluorescent coating composition. After adjustment for appropriate density and viscosity so as obtain the desired thickness and homogeneity, the fluorescent coating composition was coated using a dip coating method onto the outer surface of the ultra-violet lamp. The portion of the fluorescent coating composition outside the light entrance angle 61, as shown in FIG. 6, was removed. The light entrance angle 61, within which the fluorescent coating composition was coated on the ultra-violet lamp, was determined by the manner in which the lamp and the light guide were adjoined. It can vary from 60° to 180°, preferably between 90° to 120°. The optimum thickness of the fluorescent layer was also found to be related to the light entrance angle. Under most conditions, the optimum thickness of the fluorescent layer was between 7 and 10 mg/cm$^2$ (or about 20–30 µm). However, when the light entrance angle was 90° to 120°, the optimum thickness of the fluorescent layer was found to be between 8 and 9 mg/cm$^2$. At the optimum thickness, maximum light emittance was observed.

FIG. 6 shows a schematic diagram of the backlighting device of this example. A fluorescent layer 65 is formed on the exterior surface of the glass envelop of the ultra-violet lamp 66. The portion of the fluorescent layer outside the light entrance angle 61 has been removed. The light entrance angle is chosen such that the fluorescent layer will capture the maximum amount of ultra-violet light 63 while intercepting little or no visible light 62. Indeed it would already be considered superior to any of the prior art devices if combined design of the fluorescent layer and the lamp holder will allow the fluorescent layer to intercept less than 15%, or more preferably less than 10%, of the visible light. The design and construction of light guide 60 has been discussed in many prior art references and will not be repeated. FIG. 6 also shows an aluminum reflecting layer 64 (having a thickness of about 50 nm or greater) provided on the interior surface of the lamp holder 67.

EXAMPLE 2

Figure 8:
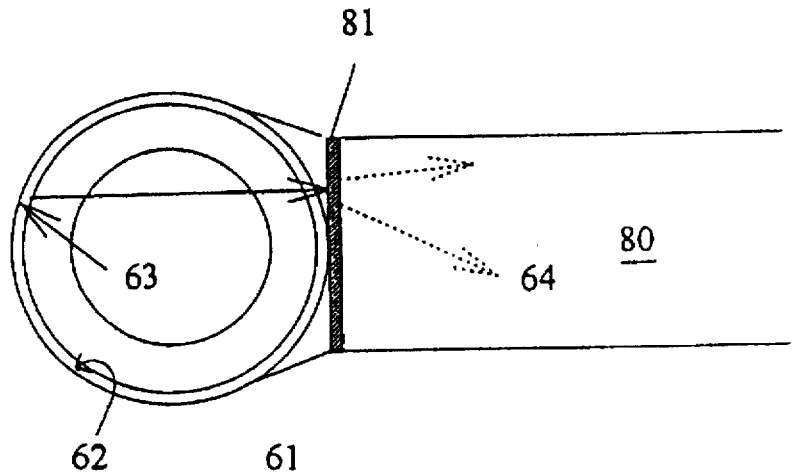
FIG. 8 is a schematic drawing of a second preferred embodiment of the backlighting device of the present invention.

FIG. 8 shows a schematic drawing of a second preferred embodiment of the backlighting device of the present invention. The embodiment in Example 2 is very similar to that discussed in Example 1, except that the fluorescent layer 81 is provided on the edge surface of the light guide 80. Similar to that shown in FIG. 6, an aluminum UV-reflecting layer 62 is provided on the interior surface of the lamp holder 61. The fluorescent layer 81 will absorb the maximum amount of ultra-violet light 63, which will be converted to visible (i.e. RGB) light 64. As shown in FIG. 8, no visible light will be intercepted by the fluorescent layer 81, thus allowing the maximum energy utilization efficiency to be achieved.

EXAMPLE 3

Figure 9:
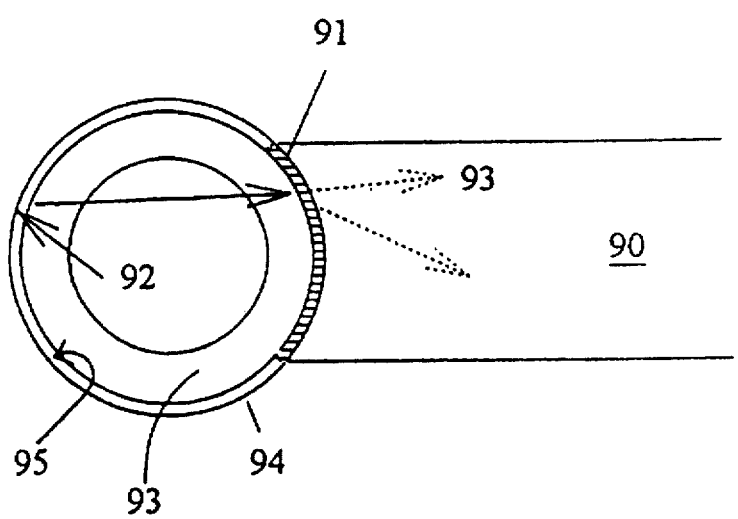
FIG. 9 is a schematic drawing of a third preferred embodiment of the backlighting device of the present invention.

FIG. 9 shows a schematic drawing of a third preferred embodiment of the backlighting device of the present invention. In this embodiment, the light guide 90 has an arcuate edge surface matching the curvature of the external surface of the quartz glass envelop 93. A fluorescent layer 91, which had necessarily the same curvature as the edge surface of the light guide 90 and the glass envelop 93, was sandwiched therebetween. Since the reflecting efficiency of the aluminum UV-reflector 95, which is similarly provided on the interior surface of the lamp holder 94, is greater than 95%, more than 95% of the emitted ultra-violet light 92 will be absorbed by the fluorescent layer 91 which will be converted to a visible light 93. Also as shown in FIG. 9, no visible light 93 will be intercepted by the fluorescent layer 91, resulting in maximum energy utilization efficiency.

EXAMPLE 4

Figure 10:
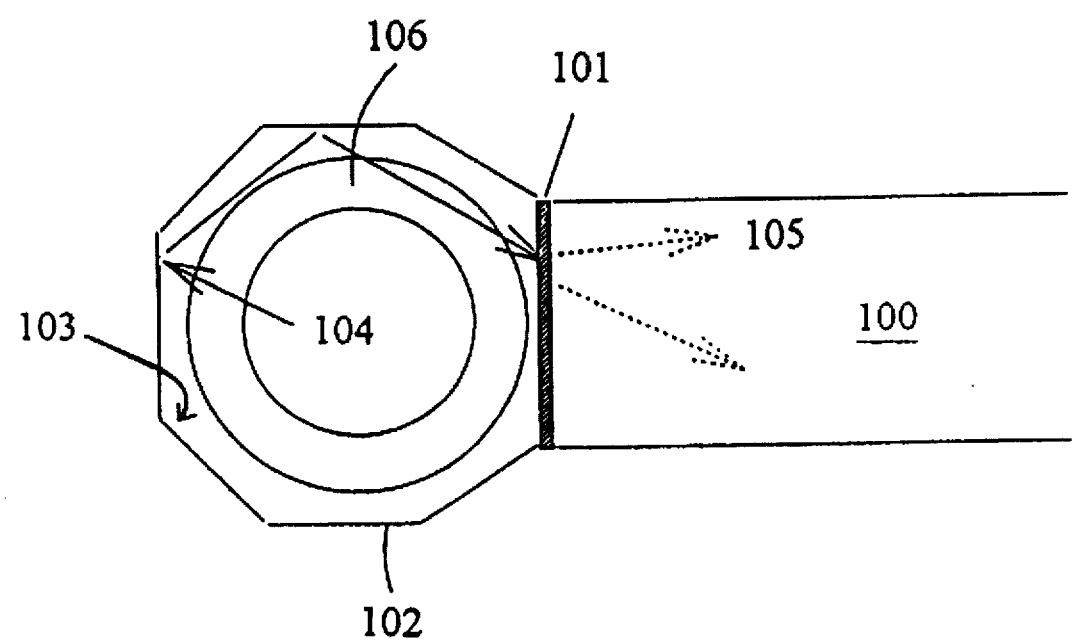
FIG. 10 is a schematic drawing of a fourth preferred embodiment of the backlighting device of the present invention.

FIG. 10 shows a schematic drawing of a fourth preferred embodiment of the backlighting device of the present invention. The construction of embodiment is very similar to that in Example 2, except that the lamp holder had a polygonal shape, instead of the spherical shape. Similar to that shown in FIG. 8, an aluminum UV-reflecting layer 103 is provided on the interior surface of the lamp holder 102. The fluorescent layer 101, which is provided on the edge surface of the light guide 100, will absorb the maximum amount of ultra-violet light 104, which will be converted to visible light 105. No visible light will 105 be intercepted by the fluorescent layer 101, thus allowing the maximum energy utilization efficiency to be achieved. The polygonal shape of the lamp holder 102 reduces the number of times that the ultra-violet light will have to travel through the glass envelop 106.

The foregoing description of the preferred embodiments of this invention has been presented for purposes of illustration and description. Obvious modifications or variations are possible in light of the above teaching. The embodiments were chosen and described to provide the best illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

What is claimed is:

1. A backlighting device for liquid crystal displays comprising:

(a) a UV lamp for emitting UV light, said UV lamp having a UV transmitting envelop;

(b) a light guide disposed in front of said UV lamp which allows visible light to travel therethrough, said light guide having a front surface, a rear surface, and a proximal edge surface;

(c) a lamp holder with a UV-reflecting interior surface, said UV-reflecting interior surface and said proximal edge surface of said light guide cooperatively enclosing said UV lamp; and (d) a fluorescent layer placed between an exterior surface of said UV transmitting envelop of said UV lamp and said proximal edge surface of said light guide capable of converting UV light into visible light.

2. A backlighting device for liquid crystal displays according to claim 1 wherein said UV transmitting envelop of said UV lamp is a quartz glass envelop having a transmittance to UV light at 254 nm of at least 90%.

3. A backlighting device for liquid crystal displays according to claim 1 wherein said lamp holder and said fluorescent layer are constructed such that no more than 15% of said visible light converted from said UV light will be intercepted by said fluorescent layer.

4. A backlighting device for liquid crystal displays according to claim 1 wherein said lamp holder and said fluorescent layer are constructed such that essentially none of said visible light converted from said UV light will be intercepted by said fluorescent layer.

5. A backlighting device for liquid crystal displays according to claim 1 wherein said fluorescent layer is disposed on a portion of said exterior surface of said UV transmitting envelop facing said proximal edge surface of said light guide.

6. A backlighting device for liquid crystal displays according to claim 5 wherein said fluorescent layer encompasses an angle of about 60° to 180°, measured from a center of said UV-transmitting envelop.

7. A backlighting device for liquid crystal displays according to claim 5 wherein said fluorescent layer encompasses an angle of about 90° to 120°, measured from a center of said UV-transmitting envelop.

8. A backlighting device for liquid crystal displays according to claim 1 wherein said fluorescent layer is formed on said proximal edge surface of said light guide.

9. A backlighting device for liquid crystal displays according to claim 1 wherein:

(a) said proximal edge surface has an arcuate shape matching a curvature of said UV-transmitting envelope; and (b) said fluorescent layer also has a similar arcuate shape so as to allow it to be tightly sandwiched between said UV-transmitting envelop and said proximal edge surface of said light guide.

10. A backlighting device for liquid crystal displays according to claim 1 said UV-reflecting interior surface is formed by coating with a layer of a high-purity aluminum material having reflectivity to UV light at 254 nm of at least 95%.

11. A backlighting device for liquid crystal displays according to claim 1 further comprises a visible light reflector means disposed behind said rear surface of said light guide.

12. A backlighting device for liquid crystal displays according to claim 1 further comprises a diffuser means disposed above said front surface of said light guide.

13. A liquid crystal display comprising:

(a) a backlight which comprises:

(i) a UV lamp for emitting UV light, said UV lamp having a UV transmitting envelop;

(ii) a light guide disposed in front of said UV lamp which allows visible light to travel therethrough, said light guide having a front surface, a rear surface, and a proximal edge surface;

(iii) a lamp holder with a UV-reflecting interior surface, said UV-reflecting interior surface and said proximal edge surface of said light guide cooperatively enclosing said UV lamp;

(iv) a fluorescent layer placed between an exterior surface of said UV transmitting envelop of said UV lamp and said proximal edge surface of said light guide capable of converting UV light into visible light; and (v) a visible light reflector means disposed behind said rear surface of said light guide;

(b) a liquid crystal display panel disposed above said front surface of said light guide; and (c) a diffuser means disposed between said front surface of said light guide and said liquid crystal display panel.

14. A liquid crystal display according to claim 13 which is a color liquid crystal display.

15. A liquid crystal display according to claim 13 wherein said UV transmitting envelop of said UV lamp is a quartz glass envelop having a transmittance to UV light at 254 nm of at least 90%.

16. A liquid crystal display according to claim 13 wherein said lamp holder and said fluorescent layer are constructed such that less than 15% of said visible light converted from said UV light will be intercepted by said fluorescent layer.

17. A liquid crystal display according to claim 13 wherein said fluorescent layer is disposed on a portion of said exterior surface of said UV transmitting envelop facing said proximal edge surface of said light guide.

18. A liquid crystal display according to claim 13 wherein said fluorescent layer is formed on said proximal edge surface of said light guide.

19. A liquid crystal display according to claim 13 wherein:

(a) said proximal edge surface has an arcuate shape matching a curvature of said UV-transmitting envelope; and (b) said fluorescent layer also has a similar arcuate shape so as to allow it to be tightly sandwiched between said UV-transmitting envelop and proximal edge surface of said light guide.

20. A liquid crystal display according to claim 1 wherein said UV-reflecting interior surface is formed with a layer of a high-purity aluminum material having reflectivity to UV light at 254 nm of at least 95%.

\* \* \* \* \*